Patented Feb. 26, 1935

1,992,469

UNITED STATES PATENT OFFICE 1,992,469

ANTIFREEZE SOLUTION

Robert W. Cairns, Baltimore, Md., assignor to The Firestone Tire & Rubber Company, Akron, Ohio, a corporation of Ohio No Drawing. Application February 11, 1933, Serial No. 656,383

4 Claims. (Cl. 252—5)

This invention relates to anti-freeze solutions, and more especially it relates to anti-freeze solutions suitable for use in the cooling systems of motor vehicles.

Heretofore anti-freeze solutions of the character mentioned have been of two general classes, the highly volatile fluids such as methyl alcohol or ethyl alcohol, and the thick, syrupy non-volatile fluids such as ethylene glycol or glycerine. The volatile fluids are open to the objection that they boil away and require constant replacement to perform effective service. The permanent anti-freeze solutions of the nature of glycerine have a strong tendency to foam, and have relatively high viscosity as compared to water or the simple alcohols. This is especially true at subnormal temperatures. Consequently some of the permanent anti-freeze materials on the market have other ingredients mixed with the glycerine to overcome these objections.

The chief objects of the invention are to provide an improved economical, permanent anti-freeze solution; to produce an anti-freeze solution of low viscosity; and to obviate foaming of the solution.

The improved anti-freeze solution constituting this invention consists of a mixture of glycerine and tetrahydrofurfuryl alcohol, $C_4H_7O.CH_2OH$. The latter has a boiling point of 177–178° centigrade and a density of 1.0514. It is a relatively non-volatile material, which is a very desirable characteristic in permanent anti-freezes. It is also contemplated that aqueous solutions of tetrahydrofurfuryl alcohol or the latter material undiluted may also be used as anti-freeze liquids in the cooling systems of internal combustion engines.

Mixtures of tetrahydrofurfuryl alcohol and water give the following freezing points:

| Percent by volume | Freezing point °C. | Freezing point °F. |
|---|---|---|
| 10 | −2.2 | 28 |
| 20 | −5.1 | 22.8 |
| 30 | −8.5 | 16.7 |
| 40 | −13.4 | 7.9 |
| 50 | −20.3 | −4.5 |
| 60 | −28.1 | −20.6 |
| 70 | −42 | −43.6 |
| 80 | −53 | −63.4 |

High concentrations of aqueous solutions of tetrahydrofurfuryl alcohol or tetrahydrofurfuryl alcohol undiluted are especially advantageous for use in the cooling systems of airplanes.

Tetrahydrofurfuryl alcohol may be added to aqueous solutions of glycerine for effectively reducing the viscosity of the latter. The freezing points of aqueous solutions of several mixtures of tetrahydrofurfuryl alcohol (T. H. F. A.) and glycerine are given below. The freezing points recorded are temperatures at which crystals will just appear and continue to grow. The glycerine used is of regular anti-freeze grade and tests 98% according to specific gravity measurements.

Freezing points

| Composition of anti-freeze | Concentration of aqueous solution | | | | | | | |
|---|---|---|---|---|---|---|---|---|
| Percentage by volume | 25% | | 37½% | | 50% | | 60% | |
| | °C. | °F. | °C. | °F. | °C. | °F. | °C. | °F. |
| 100% Glycerol | −9.2 | 15.4 | −17.0 | 1.4 | −28.0 | −18.4 | −43.0 | −45.4 |
| 75% Glycerol, 25% T. H. F. A. | −8.5 | 16.7 | −16.0 | 3.2 | −27.0 | −16.6 | −39.0 | −38.2 |
| 50% Glycerol, 50% T. H. F. A. | −8.0 | 17.6 | −14.7 | 5.6 | −25.0 | −13.0 | −36.0 | −32.2 |
| 25% Glycerol, 75% T. H. F. A. | −7.5 | 18.5 | −13.5 | 7.7 | −23.0 | −9.4 | −33.0 | −27.4 |
| 100% T. H. F. A | −6.8 | 19.6 | −12.0 | 10.4 | −20.3 | −4.6 | −28.1 | −20.6 |

In the above mixtures the normal foaming tendency of the glycerine is overcome and its viscosity reduced. Tetrahydrofurfuryl alcohol may likewise be mixed with aqueous solutions of ethylene glycol with advantageous results. Any of the above solutions have the further advantage of being non-volatile, and economical to manufacture.

Modification may be resorted to without departing from the spirit of the invention or the scope of the appended claims.

What is claimed is:

1. An anti-freeze fluid comprising an aqueous solution of tetrahydrofurfuryl alcohol, said solution being relatively non-volatile, non-foaming, non-corrosive, and retaining its low viscosity at low temperatures.

2. An anti-freeze fluid comprising an aqueous solution of tetrahydrofurfuryl alcohol and glycerine.

3. An anti-freeze fluid comprising an aqueous solution of tetrahydrofurfuryl alcohol and ethylene glycol.

4. An anti-freeze fluid comprising an aqueous solution of tetrahydrofurfuryl alcohol, ethylene glycol and glycerine.

ROBERT W. CAIRNS.